United States Patent [19]

Neely, Jr.

[11] Patent Number: 4,478,905

[45] Date of Patent: Oct. 23, 1984

[54] SPANDREL PRODUCT WITH SILICATE COATING

[75] Inventor: James E. Neely, Jr., Butler, Pa.

[73] Assignee: PPG Industries, Inc., Pittsburgh, Pa.

[21] Appl. No.: 443,502

[22] Filed: Nov. 22, 1982

Related U.S. Application Data

[63] Continuation-in-part of Ser. No. 388,330, Jun. 14, 1982, , which is a continuation-in-part of Ser. No. 286,993, Jul. 27, 1981, Pat. No. 4,334,941, which is a continuation-in-part of Ser. No. 142,492, Apr. 21, 1980, Pat. No. 4,288,252, which is a continuation of Ser. No. 973,479, Dec. 26, 1978, abandoned.

[51] Int. Cl.$^3$ .................. B13B 13/04; C09J 1/02; B32B 17/06
[52] U.S. Cl. .................. 428/324; 428/426; 428/428; 428/432; 428/433; 428/446; 428/450; 428/454; 428/701
[58] Field of Search .............. 428/34, 428, 426, 432, 428/433, 457, 446, 450, 454, 701, 702, 324; 156/107, 99; 106/74, 84

[56] References Cited

U.S. PATENT DOCUMENTS

| | | | |
|---|---|---|---|
| 2,662,022 | 12/1953 | Dietz | 106/74 |
| 3,087,827 | 4/1963 | Klenke | 106/291 |
| 3,087,828 | 4/1963 | Linton | 106/291 |
| 3,087,829 | 4/1963 | Linton | 106/291 |
| 3,178,299 | 4/1965 | Wilborn | 106/74 |
| 3,445,257 | 5/1969 | Hloch | 106/84 |
| 3,454,410 | 7/1969 | Schutt | 106/74 |
| 3,869,198 | 3/1975 | Ballentine | 350/259 |
| 3,919,023 | 11/1975 | Bowser | 428/34 |
| 3,930,876 | 1/1976 | Nakajima | 106/84 |
| 3,943,231 | 3/1976 | Wasel-Nielsen | 106/74 |
| 3,951,525 | 4/1976 | Ballentine | 350/259 |
| 4,149,348 | 4/1979 | Pyzewski | 428/34 |
| 4,173,668 | 11/1979 | Hentzelt | 428/34 |
| 4,205,104 | 5/1980 | Chenel | 428/34 |
| 4,288,252 | 9/1981 | Neely | 106/74 |
| 4,312,673 | 1/1982 | Neely | 106/74 |
| 4,334,941 | 6/1982 | Neely, Jr. | 156/107 |

Primary Examiner—Ellis P. Robinson
Attorney, Agent, or Firm—Donna L. Seidel

[57] ABSTRACT

A spandrel product is disclosed wherein the opaque coating is formulated from an alkali silicate composition cured with an inorganic hardener.

16 Claims, No Drawings

SPANDREL PRODUCT WITH SILICATE COATING

CROSS-REFERENCE TO RELATED APPLICATIONS

This application is a continuation-in-part of U.S. Application Ser. No. 388,330 of the same inventor filed June 14, 1982, which is a continuation-in-part of U.S. Application Ser. No. 286,993 of the same inventor filed July 27, 1981 and now U.S. Pat. No. 4,334,941, which is a continuation-in-part of U.S. Application Ser. No. 142,492 of the same inventor filed Apr. 21, 1980 and now U.S. Pat. No. 4,288,252, which is a continuation of U.S. Application Ser. No. 973,479 of the same inventor filed Dec. 26, 1978 and now abandoned.

FIELD OF THE INVENTION

The present invention relates generally to the art of inorganic silicate compositions and more particularly to the art of using inorganic silicate compositions to form an opaque coating layer in a spandrel product.

BACKGROUND OF THE INVENTION

U.S. Pat. No. 3,445,257 to Hloch et al describes condensed aluminum phosphates used as hardeners for water glass cements. The condensed aluminum phosphates are prepared by subjecting aluminum orthophosphates to a stepwise thermal treatment. The cements are prepared from potash or soda water glasses by mixing 90 to 100 parts filler with 4 parts hardener, and then adding 25 to 30 parts of water glass. A typical cement has a pot life of 30 minutes and then cures within 24 hours to form a mass that is resistant to acids and water.

U.S. Pat. No. 3,930,876 to Nakajima et al discloses an improved silica-phosphate type inorganic coating composition comprising a water soluble silicate and an inorganic phosphate pretreated with such silicate. The pretreatment is accomplished by mixing the phosphate, in powder form, with an aqueous solution of the silicate in a mechanical mill. Filler and/or pigment in amounts of 60 percent by weight or less based on the weight of the pretreated phosphate may be added during or after the pretreatment of the phosphate. About 60 to 150 parts by weight of the pretreated phosphate and 100 parts by weight of silicate are then mixed together to form a uniform composition generally having a water content of $\frac{1}{4}$ to 2 parts by weight water per part of total solids.

U.S. Pat. Nos. 3,869,198 and 3,951,525 to Ballentine relate to durable glass spandrels provided with transparent light and heat reflective coatings and substantially opaque ceramic enamel coatings to produce aesthetically matched vision and spandrel areas in curtainwall construction by utilizing a ceramic enamel coating which reflects light in the same spectral region as light transmitted by the transparent coating and glass in combination. Commercially available ceramic enamels are disclosed.

SUMMARY OF THE INVENTION

The present invention provides a method for formulating inorganic compositions to be used as water-stable paints or cements which can be cured at relatively low temperatures. The method of the present invention involves milling or blending a mixture of inorganic curing agent, filler and alkali silicate. The water content of the mixture is varied to produce either a paint or a cementitious material. The aqueous compositions of the present invention are applied, dried and cured at relatively low temperatures and are useful in a wide variety of applications such as protective coatings for metal films on architectural spandrels, as solar collector coatings or as water-stable cements for joining glass panes in a multiple glazed window unit.

DESCRIPTION OF THE PREFERRED EMBODIMENT

Aqueous alkali metal or ammonium silicate compositions containing inorganic curing agents are prepared according to the method of the present invention as follows.

A mixture of inorganic curing agent and inorganic pigments is wet-milled in any typical mechanical mixer such as a ball mill, pebble mill or sand mill. The inorganic curing agent may comprise any of the variety of metal phosphate, borate or zincate curing agents which are useful for hardening silicate compositions, and preferably comprises the B-form of aluminum trimetaphosphate as disclosed in U.S. Pat. Nos. 4,216,190 and 4,329,327, which disclosures are incorporated herein by reference. Suitable fillers include numerous inorganic compounds which provide desirable properties, such as mica, $TiO_2$, and quartz as well as various pigments and metallic particles which provide desirable colors, textures and finishes to a spandrel product. These inorganic compounds may be blended into the alkali silicate component, but are preferably blended with the inorganic curing agent.

The hardener is blended into an alkali silicate, preferably a mixture of sodium silicate and potassium silicate. Preferred sodium silicates have $SiO_2/Na_2O$ mole ratios between 3.1 and 4.0 while preferred potassium silicates have $SiO_2/K_2O$ mole ratios between 3.3 and 4.0. Preferred mixtures of alkali metal silicates comprise about 25 to 75 weight percent sodium silicate and 25 to 75 weight percent potassium silicate, although other cations such as lithium or ammonium may be present. As the ratio of silicon to metal in the silicate increases, higher silicate to curing agent ratios are preferred. The ratio of total silicate to curing agent is preferably above 2.0 by weight. The water content of the composition depends on the method of application of the composition as a paint or a cement. Prior to blending with the alkali silicate, the hardener may be neutralized with a base such as an alkali metal or ammonium hydroxide or calcium aluminate in order to prevent the formation of lumps when the acidic hardener is mixed with the alkaline silicate.

After application for its intended use, the composition is preferably air dried to remove the water and then cured, typically at temperatures of about 190° to 250° C. The cured composition is relatively nonporous and water stable, especially if a suitable mixture of alkali silicates is used as disclosed in U.S. Pat. No. 4,312,673, which disclosure is incorporated herein by reference.

The present invention will be further understood by the descriptions of specific examples which follow.

EXAMPLE I

An opacifier coating for a glass spandrel product is prepared by first mixing 1972.2 grams potassium silicate solution with 1636.8 grams of sodium silicate solution. The former is commercially available as KASIL 1 from the PQ Corporation of Philadelphia, while the latter is DS Grade 34 from Diamond Shamrock of Cleveland. To the mixed alkali silicate solution is added 290.9 grams of titanium dioxide coated mica filler, available as Afflair 440 from E. M. Chemicals of Hawthorne, New York. A second component comprising 1214.6 grams of water, 789.58 grams of Shepherd black #1 pigment from the Shepherd Color Company of Cincinnati, and 296.09 grams of aluminum trimetaphosphate, predominantly in the B-form, prepared by the reaction of aluminum hydroxide and ammonium phosphate, is sand milled and then added to the silicate solution with high speed, high shear mixing.

The above composition is suitable for application by various means, but in this example is applied at ambient temperature by conventional spray guns to the coated surface of a glass substrate. The coating on the glass is a metal-containing film deposited by magnetic sputtering. The silicate opacifier coating is cured at a temperature of about 400° to 455° F. (about 204° to 235° C.) for a period of about 10 to 30 minutes.

EXAMPLE II

A silicate coating which, when applied to a glass spandrel product, resembles the appearance of an aluminum panel is prepared as follows. A mixed alkali silicate composition is formed by combining 450 grams of potassium silicate solution (KASIL 1), 375 grams of sodium silicate solution (DS Grade 34) and 120.1 grams of titanium dioxide coated mica (Afflair 100). To this solution are added 112 grams of water, 9 grams of Shepherd black pigment #1, and 67.8 grams of B-form aluminum trimetaphosphate prepared as in Example I. The composition is sprayed at ambient temperature onto an uncoated glass surface, dried for about 15 minutes at about 150° C., and cured at about 220° C. for about 15 minutes. The cured coated product resembles an aluminum panel when viewed toward the silicate coated surface.

EXAMPLE III

A silicate coated glass spandrel which resembles a bronze panel is prepared from a first component consisting of 450 grams of potassium silicate solution (KASIL 1) and 375 grams of sodium silicate solution (DS Grade 34), and a second component comprising a sand-milled slurry of 117 grams of water, 67.8 grams of B-form aluminum trimetaphosphate as in Example II, and 62.9 grams of black pigment (Shepherd #1), to which is added 60.9 grams of mica coated with $TiO_2$ and $Fe_2O_3$ (Afflair 400). The composition is sprayed onto a glass surface, dried and cured as in Example II.

EXAMPLE IV

An opaque blue coating for a glass spandrel product to match, harmonize, complement or contrast with a vision unit is prepared from a composition consisting of 225 grams of potassium silicate solution (KASIL 1), 187.5 grams of sodium silicate solution (DS Grade 34), 51 grams of water, 31.8 grams Shepherd blue pigment #3, 60 grams of talc (Talcron from Pfizer Chemicals) and 33.9 grams of B-form aluminum trimetaphosphate. The composition is sprayed onto a glass surface at ambient temperature, heated to about 100° C. over a period of about 20 minutes, held at 100° C. for about 40 minutes, heated to about 220° C. over a period of about 70 minutes and held at 220° C. for about 10 minutes to cure the silicate composition.

The above examples are offered to illustrate the present invention. Various modifications such as the use of other pigments and fillers, the coating of substrates other than glass, such as other refractories and metals, and so on are included within the scope of the present invention which is defined by the following claims.

I claim:
1. An article of manufacture comprising:
   a. a rigid substrate; and
   b. disposed on a major surface of said substrate an opaque coating composition comprising:
      1. an alkali silicate; and
      2. an aluminum trimetaphosphate hardener predominantly in the B-form.
2. An article according to claim 1, wherein the alkali silicate is a mixture of sodium silicate and potassium silicate.
3. An article according to claim 1, wherein the composition further comprises a component selected from the group consisting of pigments, fillers and mixtures thereof.
4. An article according to claim 3, wherein said component comprises a filler selected from the group consisting of mica, talc and mixtures thereof.
5. An article according to claim 4, wherein said filler comprises mica coated with a metal oxide.
6. An article according to claim 5, wherein said mica filler is coated with the oxide of a metal selected from the group consisting of titanium, iron, chromium and mixtures thereof.
7. An article according to claim 6, wherein said composition comprises black pigment.
8. An article according to claim 7, wherein the amounts of pigment and filler are sufficient to produce a coating with a metallic appearance.
9. An article of manufacture comprising:
   a. a glass substrate; and
   b. disposed on a major surface of said substrate an opaque coating composition comprising:
      1. an alkali silicate; and
      2. an aluminum trimetaphosphate hardener predominantly in the B-form.
10. An article according to claim 9, wherein the alkali silicate is a mixture of sodium silicate and potassium silicate.
11. An article according to claim 13, wherein the composition further comprises a component selected from the group consisting of pigments, fillers and mixtures thereof.
12. An article according to claim 11, wherein said component comprises a filler selected from the group consisting of mica, talc and mixtures thereof.
13. An article according to claim 12, wherein said filler comprises mica coated with a metal oxide.
14. An article according to claim 13, wherein said mica filler is coated with the oxide of a metal selected from the group consisting of titanium, iron, chromium and mixtures thereof.
15. An article according to claim 14, wherein said composition comprises black pigment.
16. An article according to claim 15, wherein the amounts of pigment and filler are sufficient to produce a coating with a metallic appearance.

* * * * *

UNITED STATES PATENT AND TRADEMARK OFFICE
CERTIFICATE OF CORRECTION

PATENT NO. : 4,478,905

DATED : October 23, 1984

INVENTOR(S) : James E. Neely, Jr.

It is certified that error appears in the above-identified patent and that said Letters Patent are hereby corrected as shown below:

In column 4, line 46, Claim 11, "13" should read --9--.

*Signed and Sealed this*

Twentieth *Day of* August 1985

[SEAL]

*Attest:*

DONALD J. QUIGG

*Attesting Officer*   *Acting Commissioner of Patents and Trademarks*